US007633876B2

(12) United States Patent
Schine

(10) Patent No.: US 7,633,876 B2
(45) Date of Patent: Dec. 15, 2009

(54) SYSTEM AND METHOD FOR MONITORING A SWITCHED METRO ETHERNET NETWORK

(75) Inventor: Bruce A. Schine, San Leandro, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 719 days.

(21) Appl. No.: 11/209,190

(22) Filed: Aug. 22, 2005

(65) Prior Publication Data
US 2007/0041329 A1 Feb. 22, 2007

(51) Int. Cl.
*H04J 1/16* (2006.01)
(52) U.S. Cl. ...................................... 370/241
(58) Field of Classification Search .............. 370/241, 370/389, 401
See application file for complete search history.

(56) References Cited

U.S. PATENT DOCUMENTS

| 6,112,236 A | 8/2000 | Dollin et al. |
| 6,201,793 B1 | 3/2001 | Chen et al. |
| 6,321,264 B1 | 11/2001 | Fletcher et al. |
| 6,643,612 B1 | 11/2003 | Lahat et al. |
| 6,701,342 B1 | 3/2004 | Bartz et al. |
| 6,701,392 B1 | 3/2004 | Halstead et al. |
| 6,751,231 B2 | 6/2004 | Fellman et al. |
| 6,792,455 B1 | 9/2004 | DeLuca et al. |
| 6,792,459 B2 | 9/2004 | Elnozahy et al. |
| 6,807,156 B1 | 10/2004 | Veres et al. |
| 2002/0077836 A1 | 6/2002 | Elnozahy et al. |
| 2003/0005112 A1 | 1/2003 | Krautkremer |
| 2003/0065769 A1 | 4/2003 | Kryskow, Jr. et al. |
| 2003/0093244 A1* | 5/2003 | Corlett et al. ............... 702/186 |
| 2003/0198235 A1 | 10/2003 | Weldon et al. |
| 2004/0095893 A1 | 5/2004 | Goringe et al. |
| 2004/0261116 A1* | 12/2004 | Mckeown et al. ........... 725/109 |
| 2005/0094567 A1 | 5/2005 | Kannan et al. |
| 2005/0122983 A1 | 6/2005 | Gilmartin et al. |
| 2006/0092931 A1* | 5/2006 | Walter et al. ................ 370/389 |
| 2006/0098670 A1* | 5/2006 | Voit et al. .................... 370/401 |

OTHER PUBLICATIONS

Les Cottrell, Throughput versus loss, Feb. 16, 2000, Stanford Linear Accelerator Center, pp. 1-7, http://www.slac.stanford.edu/comp/net/wan-mon/thru-vs-loss.html.*
John J Komo, Random Signal Analysis in Engineering Systems, 1987, Academic Press, Inc. p. 29.*

* cited by examiner

*Primary Examiner*—Derrick W Ferris
*Assistant Examiner*—Christopher R Crompton
(74) *Attorney, Agent, or Firm*—Toler Law Group

(57) ABSTRACT

A method for monitoring a network includes determining at least one of a jitter value or a delay value of a network connection between a source switch and a destination switch of the network. The method further includes determining a packet delivery rate value for each network segment of a sequence of one or more network segments connecting the source switch and the destination switch, each network segment comprising two switches, wherein at least one of the two switches is connected to one of a switch of another network segment, the source switch, or the destination switch. The method additionally includes determining an overall packet delivery rate value based on the one or more packet delivery rate values determined for each network segment of the sequence of one or more network segments.

19 Claims, 10 Drawing Sheets

US 7,633,876 B2

SYSTEM AND METHOD FOR MONITORING A SWITCHED METRO ETHERNET NETWORK

FIELD OF THE DISCLOSURE

The present disclosure relates generally to the monitoring of switched metro Ethernet networks.

BACKGROUND

Ethernet is a local-area network architecture that originally was originally developed in the late 1970s for use in offices, e.g., to interconnect computers to each other and to a common printer. In recent years, companies have begun to develop ways to expand Ethernet principles to wide area networks, e.g., using Internet routers that are interconnected in various ways. The result has been the creation of switched metro Ethernet data networks.

In an effort to market switched metro Ethernet services, service providers can offer varying levels of service for different prices. Moreover, a service can be considered a high level service and may be offered at a premium price if it has certain characteristics that are beneficial to customers. For example, a service provider may offer a service in which data is delivered at a relatively high packet delivery rate. Further, a service level agreement between a service provider and a customer may state that the data will be delivered at or above a particular packet delivery rate and the customer will pay a particular fee for that promised packet delivery rate. However, it can be difficult to provide an indication to a customer that the service they are receiving is meeting the level agreed to in the service level agreement.

Accordingly, there is a need for a system and method for collecting and presenting service level agreement metrics in a switched metro Ethernet network.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
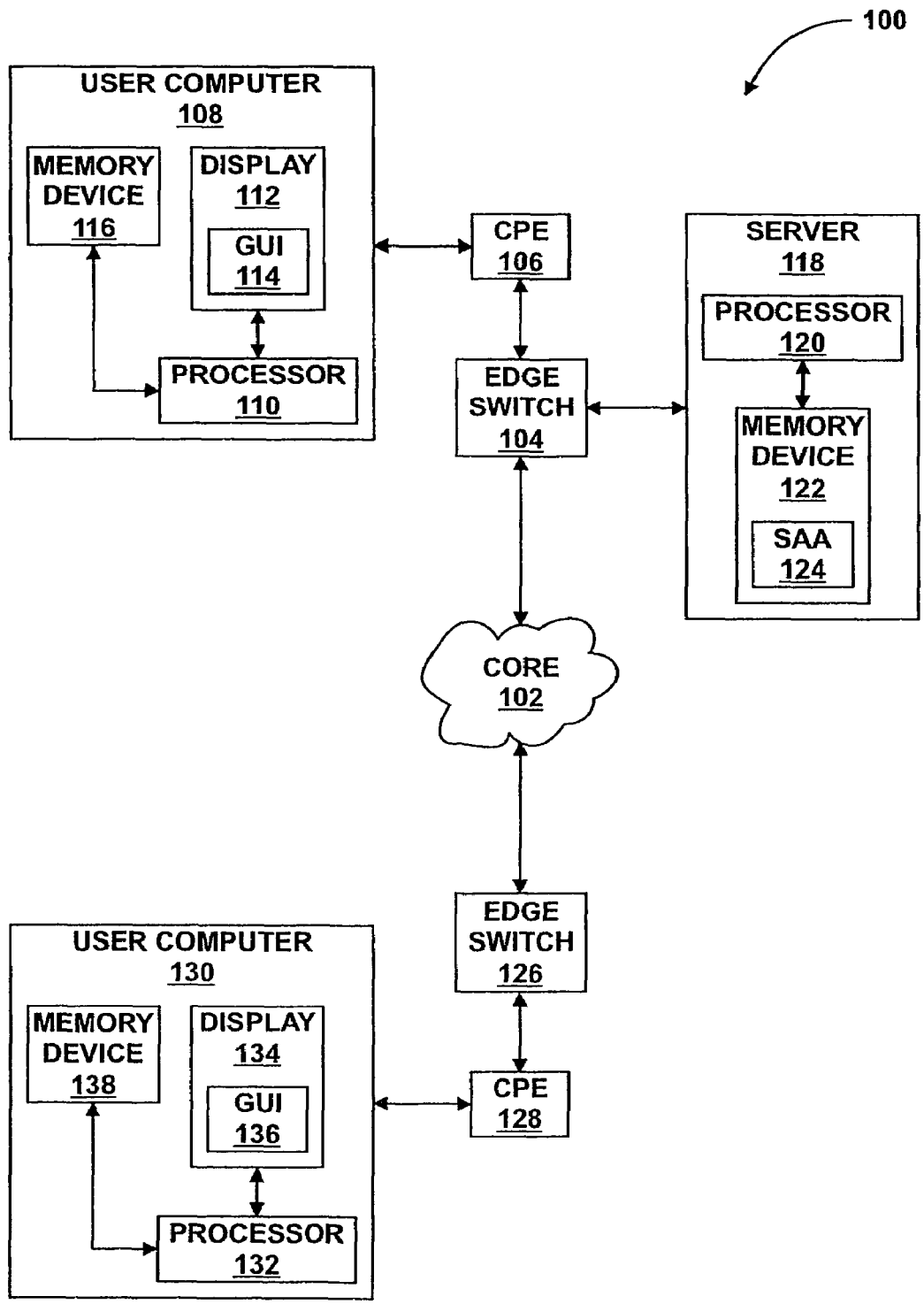
FIGS. 1, 3, 5, 7 and 8 are diagrams of switched metro Ethernet systems.

In one embodiment, a method for monitoring a network includes determining at least one of a jitter value or a delay value of a network connection between a source switch and a destination switch of the network. The method further includes determining a packet delivery rate value for each network segment of a sequence of one or more network segments connecting the source switch and the destination switch, each network segment comprising two switches, wherein at least one of the two switches is connected to one of a switch of another network segment, the source switch, or the destination switch. The method additionally includes determining an overall packet delivery rate value based on the one or more packet delivery rate values determined for each network segment of the sequence of one or more network segments.

In another embodiment, a server includes a processor, a memory device coupled to the processor, and a service assurance agent represented by a plurality of executable instructions stored at the memory device. The plurality of executable instructions includes instructions to manipulate the processor to determine at least one of a jitter value or a delay value between a source switch and a destination switch of a network connection. The plurality of executable instructions further include instructions to manipulate the processor to determine a packet delivery rate value for each network segment of a sequence of one or more network segments connecting the source switch and the destination switch, each network segment comprising two switches, wherein at least one of the two switches is connected to one of a switch of another network segment, the source switch, or the destination switch. The plurality of executable instructions also include instructions to manipulate the processor to determine an overall packet delivery rate value based on the one or more packet delivery rate values determined for each network segment of the sequence of one or more network segments.

In a switched metro Ethernet network having a first core switch, a second core switch, a first edge switch and a second edge switch, where the first core switch is coupled to the first edge switch and wherein the second core switch is coupled to the second edge switch, a method includes determining at least one of a first jitter value or a first delay value between the first edge switch and the second edge switch. The method further includes determining a first packet delivery rate value for a first network segment between the first core switch and the second core switch. The method additionally includes determining a second packet delivery rate value for a second network segment between the first core switch and the first edge switch and determining a third packet delivery rate value for a third network segment between the second core switch and the second edge switch. The method also includes determining a first overall packet delivery rate value between the first edge switch and the second edge switch based on the first packet delivery rate value, the second packet delivery rate value, and the third packet delivery rate value.

In another embodiment, a switched metro Ethernet network includes a core network system comprising a first core switch and a second core switch, a first edge switch coupled to the first core switch and a second edge switch coupled to the second core switch. The switched metro Ethernet network further includes a server coupled to the core network system. The server is to determine at least one of a first jitter value or a first delay value between the first edge switch and the second edge switch and determine a first packet delivery rate value for a first network segment between the first core switch and the second core switch. The server further is to determine a second packet delivery rate value for a second network segment between the first core switch and the first edge switch and determine a third packet delivery rate value for a third network segment between the second core switch and the second edge switch. The server also is to determine a first overall packet delivery rate value between the first edge switch and the second edge switch based on the first packet delivery rate value, the second packet delivery rate value, and the third packet delivery rate value.

Referring to FIG. 1, a switched metro Ethernet network is shown and is generally designated 100. As shown, the switched metro Ethernet network 100 includes a core system 102. Particularly, the core system 102 includes a plurality of switches and routers that can be used to route network traffic through the core system 102. In a particular embodiment, the switches and routers include optical communication equipment. As illustrated in FIG. 1, a first edge switch 104 is coupled to the core system 102. Also, a first customer premises equipment (CPE) 106 is coupled to the edge switch 104. FIG. 1 further shows a first user computer 108 coupled to the first CPE 106. In a particular embodiment, the CPE 106 can be a modem, a gateway, or a router. Further, the first user computer 108 can be a desktop computer, a laptop computer, a handheld computer, or any other computer device.

In a particular embodiment, the first user computer 108 includes a processor 110 and a display 112 that is coupled to the processor 110. Moreover, as illustrated in FIG. 1, a graphical user interface (GUI) 114 can be presented to a user at the first user computer 108 via the display 112. In a particular embodiment, information regarding the switched metro Ethernet network 100 including one or more metrics concerning the operation of the switched metro Ethernet network 100 can be presented to a user via the GUI 114. FIG. 1 further shows a memory device 116 that is coupled to the processor 110 within the first user computer 108.

As shown in FIG. 1, a server 118 can be coupled to the first edge switch 104. In a particular embodiment, the server 118 includes a processor 120 and a memory device 122. Further, in a particular embodiment, a service assurance agent (SAA) 124 is stored within the server 118, e.g., within the memory device 122. In a particular embodiment, the SAA 124 is a computer program that can have one or more instructions that can be executed by the processor 120 in order to collect and calculate one or more metrics concerning the operation of the switched metro Ethernet network 100. Further, the SAA 124 can present the metrics or any data derived from the metrics to the user computer 108 via the GUI 114.

FIG. 1 further shows that a second representative edge switch 126 is coupled to the core system 102. Moreover, a second CPE 128 is connected to the second edge switch 126. As illustrated in FIG. 1, a second user computer 130 is also coupled to the second CPE 128. In a particular embodiment, the second user computer 130 includes a processor 132 and a display 134 coupled thereto. Moreover, as illustrated in FIG. 1, a GUI 136 can be presented to a user at the second user computer 130. Particularly, information regarding the switched metro Ethernet network 100 including one or more metrics concerning the operation of the switched metro Ethernet network 100 can be presented to a user via the GUI 136. FIG. 1 also shows a memory device 138 that is coupled to the processor 132.

With this configuration of structure, the first user computer 108 can be networked to the second user computer 130 by the first CPE 106, the first edge switch 104, the core system 102, the second edge switch 126, and the second CPE 128. In a particular example, multiple offices of a single company at different locations can be networked via the switched metro Ethernet network 100.

Figure 2:
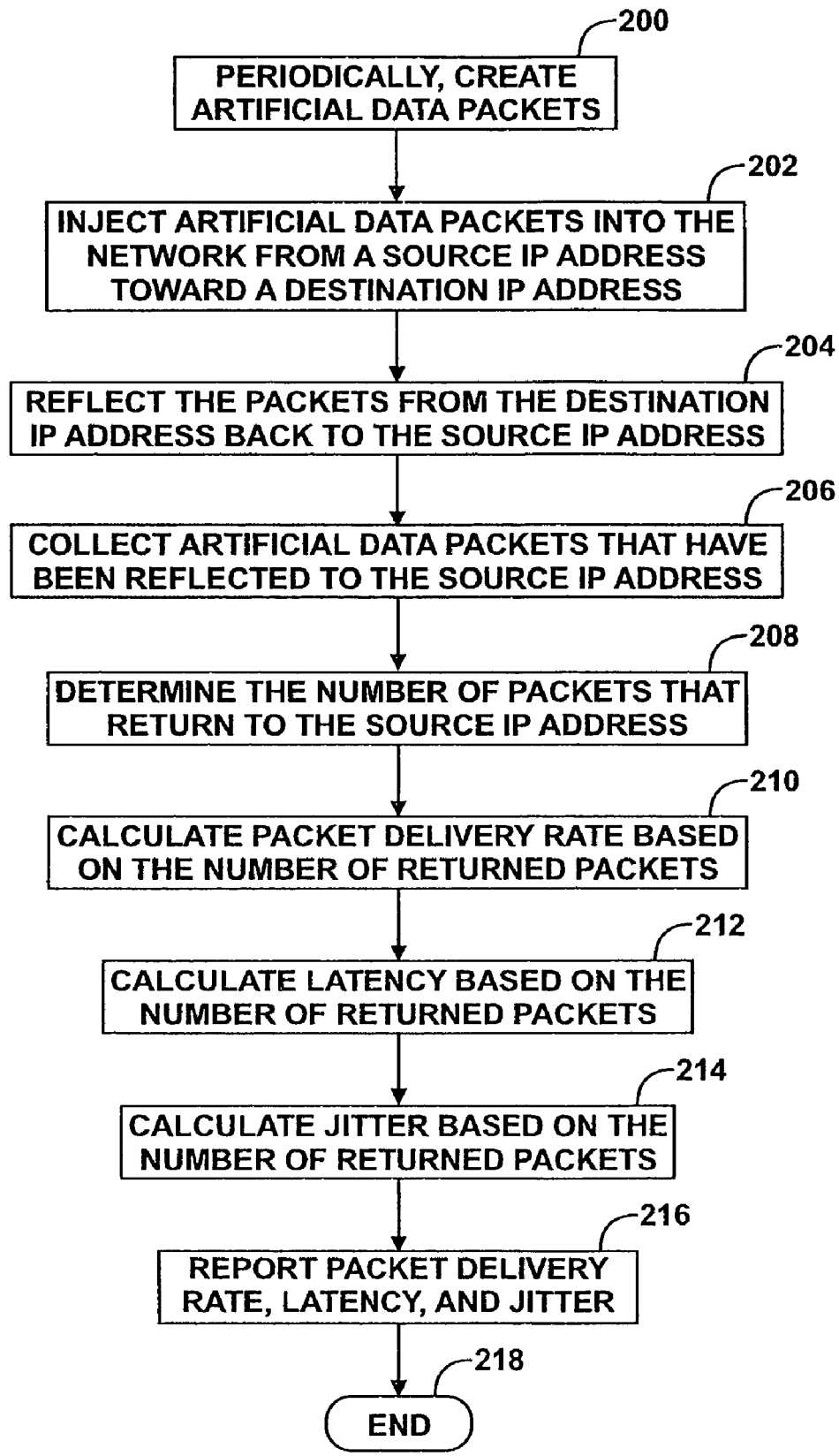
FIGS. 2, 4 and 6 are flow charts to illustrate methods for collecting one or more metrics related to a switched metro Ethernet system.

Referring to FIG. 2, a method for collecting one or more metrics related to a switched metro Ethernet system and for presenting those metrics to a user is disclosed. Commencing at block 200, the method includes periodically creating a predetermined number of artificial data packets. At block 202, the artificial data packets are injected into the network from a source Internet protocol (IP) address toward a destination IP address, e.g., from the first edge switch 104 (FIG. 1) to the second edge switch 126 (FIG. 1). In an illustrative embodiment, the artificial data packets can be created and injected into the network periodically, such as every fifteen minutes or less. Moving to block 204, the packets are reflected, or otherwise returned, from the destination IP address back to the source IP address, e.g., from the second edge switch 126 (FIG. 1) back to the first edge switch 104 (FIG. 1). Next, at block 206, the artificial data packets that have been reflected back to the source IP address are collected, e.g., by the SAA 124 (FIG. 1) within the server 118 (FIG. 1) coupled to the first edge switch 104 (FIG. 1).

Moving to block 208, a total number of packets that are reflected, or otherwise returned, to the source IP address is determined. At block 210, a packet delivery rate is calculated based on the total number of returned packets. In a particular embodiment, the packet delivery rate is a measure of the percentage of packets that reach the destination IP address and that are reflected back to the source IP address. Packet delivery rate can be determined using the following formula:

$$\text{PACKET DELIVERY RATE} = (\text{packets delivered to destination})/(\text{packets offered at source})$$

In a particular embodiment, in order to determine a more reliable value for packet delivery rate, several metrics can be used by the SAA 124 (FIG. 1). Table 1 shows several exemplary, non-limiting metrics that can be used by the SAA 124 (FIG. 1) in order to determine the packet delivery rate.

TABLE 1

Exemplary, non-limiting metrics used by the SAA in order to determine a Packet Delivery Rate.

| Variable | Measurement | Description |
|---|---|---|
| A | rttMonLatestJitterStatsNumOfRTT | The number of round trip times (RTTs) that are successfully measured |
| B | rttMonLatestJitterStatsPacketLossSD | The number of packets lost when sent from source to destination. |
| C | rttMonLatestJitterStatsPacketLossDS | The number of packets lost when sent from destination to source |
| D | RttMonLatestJitterStatsPacketOutOfSequence | The number of packets arrived out of sequence |
| E | rttMonLatestJitterStatsPacketMIA | The number of packets that are lost for which we cannot determine the direction. |
| F | RttMonLatestJitterStatsPacketLateArrival | The number of packets that arrived after the timeout |

Moreover, in a particular embodiment, the metrics shown in Table 1 can be used to determine a packet delivery rate using the following formula:

PACKET DELIVERY RATE=$(\Sigma A*100)/(\Sigma A+\Sigma B+\Sigma C+\Sigma D+\Sigma E+\Sigma F)$ Returning to the description of FIG. 2, at block 212, a latency value is calculated based on the total number of returned packets. In an illustrative embodiment, latency is the delay that the packets experience as they flow through the network, e.g., from the first edge switch 104 to the second edge switch 126 and back. Particularly, latency can include the time that packets spend in buffers and the propagation delay. In a particular embodiment, several metrics can be used by the SAA 124 (FIG. 1) in order to determine latency. Table 2 shows several exemplary, non-limiting metrics that can be used by the SAA 124 (FIG. 1) in order to determine the latency value.

TABLE 2

Exemplary, non-limiting metrics used by the SAA in order to determine a latency value.

| Measurement | Description |
|---|---|
| rttMonLatestJitterStatsNumOfRTT | The number of RTTs that are successfully measured |
| rttMonLatestJitterStatsRTTSum | The sum of RTTs that are successfully measured |
| rttMonLatestJitterStatsRTTMin | The minimum of RTTs that were successfully measured |
| rttMonLatestJitterStatsRTTMax | The maximum of RTTs that were successfully measured |
| rttMonLatestJitterStatsRTTSum2Low | The sum of squares of RTTs that are successfully measured (low/high order 32 bits) |
| rttMonLatestJitterStatsRTTSum2High | |
| rttMonJitterStatsOWSumSD | The sum of one way times from source to destination |
| rttMonJitterStatsOWMinSD | The minimum of all one way times from source to destination. |
| rttMonJitterStatsOWMaxSD | The maximum of all one way times from source to destination. |
| rttMonJitterStatsOWSumDS | The sum of one way times from destination to source. |
| rttMonJitterStatsOWMinDS | The minimum of all one way times from destination to source. |
| rttMonJitterStatsOWMaxDS | The maximum of all one way times from destination to source. |
| rttMonJitterStatsNumOfOW | The number of one way times that are successfully measured. |

In a particular embodiment, in order to calculate latency in one direction, e.g., from the first edge switch 104 (FIG. 1) to the second edge switch 126 (FIG. 1), the RTT numbers can be divided by two. Further, rttMonLatestJitterStatsRTTSum2Low and rttMonLatestJitterStatsRTTSum2High are optional metrics and can be collected if a calculation of a standard deviation is desired.

Continuing the description of FIG. 2, at block 214, a jitter value is calculated based on the total number of returned packets. In a particular embodiment, jitter is defined as the variance in the inter-packet arrival rate at the destination. In a particular embodiment, several metrics can be used by the SAA 124 (FIG. 1) in order to determine a jitter value. Table 3 shows several exemplary, non-limiting metrics that can be used by the SAA 124 (FIG. 1) in order to determine the jitter value.

TABLE 3

Exemplary, non-limiting metrics used by the SAA in order to determine a jitter value.

| Measurement | Description |
|---|---|
| rttMonJitterStatsMinOfPositivesSD | The minimum of absolute values of all positive jitter values from packets sent from source to destination. |
| rttMonJitterStatsMaxOfPositivesSD | The maximum of absolute values of all positive jitter values from packets sent from source to destination. |
| rttMonJitterStatsNumOfPositivesSD | The sum of number of all positive jitter values from packets sent from source to destination. |
| rttMonJitterStatsSumOfPositivesSD | The sum of all positive jitter values from packets sent from source to destination. |
| rttMonJitterStatsSum2PositivesSDLow | The sum of square of RTTs of all positive jitter values from packets sent from source to destination (low order 32 bits). |
| rttMonJitterStatsSum2PositivesSDHigh | The sum of square of RTTs of all positive jitter values from packets sent from source to destination (high order 32 bits). |
| rttMonJitterStatsMinOfNegativesSD | The minimum of all negative jitter values from packets sent from source to destination. |
| rttMonJitterStatsMaxOfNegativesSD | The maximum of all negative jitter values from packets sent from source to destination. |
| rttMonJitterStatsNumOfNegativesSD | The sum of number of all negative jitter values from packets sent from source to destination. |
| rttMonJitterStatsSumOfNegativesSD | The sum of RTTs of all negative jitter values from packets sent from source to destination. |
| rttMonJitterStatsSum2NegativesSDLow | The sum of square of RTTs of all negative jitter values from packets sent from source to destination (low order 32 bits). |
| rttMonJitterStatsSum2NegativesSDHigh | The sum of square of RTTs of all negative jitter values from packets sent from source to destination (high order 32 bits). |
| rttMonJitterStatsMinOfPositivesDS | The minimum of absolute values of all positive jitter values from packets sent from destination to source. |
| rttMonJitterStatsMaxOfPositivesDS | The maximum of absolute values of all positive jitter values from packets sent from destination to source. |
| rttMonJitterStatsNumOfPositivesDS | The sum of number of all positive jitter values from packets sent from destination to source. |
| rttMonJitterStatsSumOfPositivesDS | The sum of all positive jitter values from packets sent from destination to source. |
| rttMonJitterStatsSum2PositivesDSLow | The sum of square of RTTs of all positive jitter values |

TABLE 3-continued

Exemplary, non-limiting metrics used by the
SAA in order to determine a jitter value.

| Measurement | Description |
| --- | --- |
| rttMonJitterStatsSum2PositivesDSHigh | from packets sent from destination to source (low order 32 bits). The sum of square of RTTs of all positive jitter values from packets sent from destination to source (high order 32 bits). |
| rttMonJitterStatsMinOfNegativesDS | The minimum of all negative jitter values from packets sent from destination to source. |
| rttMonJitterStatsMaxOfNegativesDS | The maximum of all negative jitter values from packets sent from destination to source. |
| rttMonJitterStatsNumOfNegativesDS | The sum of number of all negative jitter values from packets sent from destination to source. |
| rttMonJitterStatsSumOfNegativesDS | The sum of RTTs of all negative jitter values from packets sent from destination to source. |
| rttMonJitterStatsSum2NegativesDSLow | The sum of square of RTTs of all negative jitter values from packets sent from destination to source (low order 32 bits). |
| rttMonJitterStatsSum2NegativesDSHigh | The sum of square of RTTs of all negative jitter values from packets sent from destination to source (high order 32 bits). |

In a particular embodiment, to calculate an average jitter value from a source to destination the following equation can be used:

$AVG\ JITTER\ SD = (rttMonJitterStatsSumOfPositivesSD + rttMonJitterStatsSumOfNegativesSD) / (rttMonJitterStatsNumOfPositivesSD + rttMonJitterStatsNumOfNegativesSD)$ Further, to calculate an average jitter value from a destination to a source, the following equation can be used:

$AVG\ JITTER\ DS = (rttMonJitterStatsSumOfPositivesDS + rttMonJitterStatsSumOfNegativesDS) / (rttMonJitterStatsNumOfPositivesDS + rttMonJitterStatsNumOfNegativesDS)$ Additionally, a maximum jitter value from a source to a destination is defined as the maximum between these values: $D_2$rttMonJitterStatsNumOfNegativesSD and rttMonJitterStatsNumOfPositivesSD.

In an illustrating embodiment, the metrics described herein are simple network management protocol management information base (SNMP MIB) objects that can be collected using an SNMP collection mechanism.

Returning to FIG. 2, at block 216, the packet delivery rate, the latency value, and the jitter value are reported to a user. In a particular embodiment, the packet delivery rate, the latency value, and the jitter value are reported to the user via a GUI 114, 136 (FIG. 1) presented at one of the user computers 108, 130 (FIG. 1), and the method ends at block 218.

In a particular embodiment, the metrics described and collected by the SAA 124 (FIG. 1) can be used to enhance or optimize the switched metro Ethernet network (FIG. 1). For example, if a user notices that a packet delivery rate between two locations is less than a stated value in a service level agreement, the user can contact the service provider who can verify the packet delivery rate and then, determine the cause of the problem and correct the problem, if possible.

Figure 3:
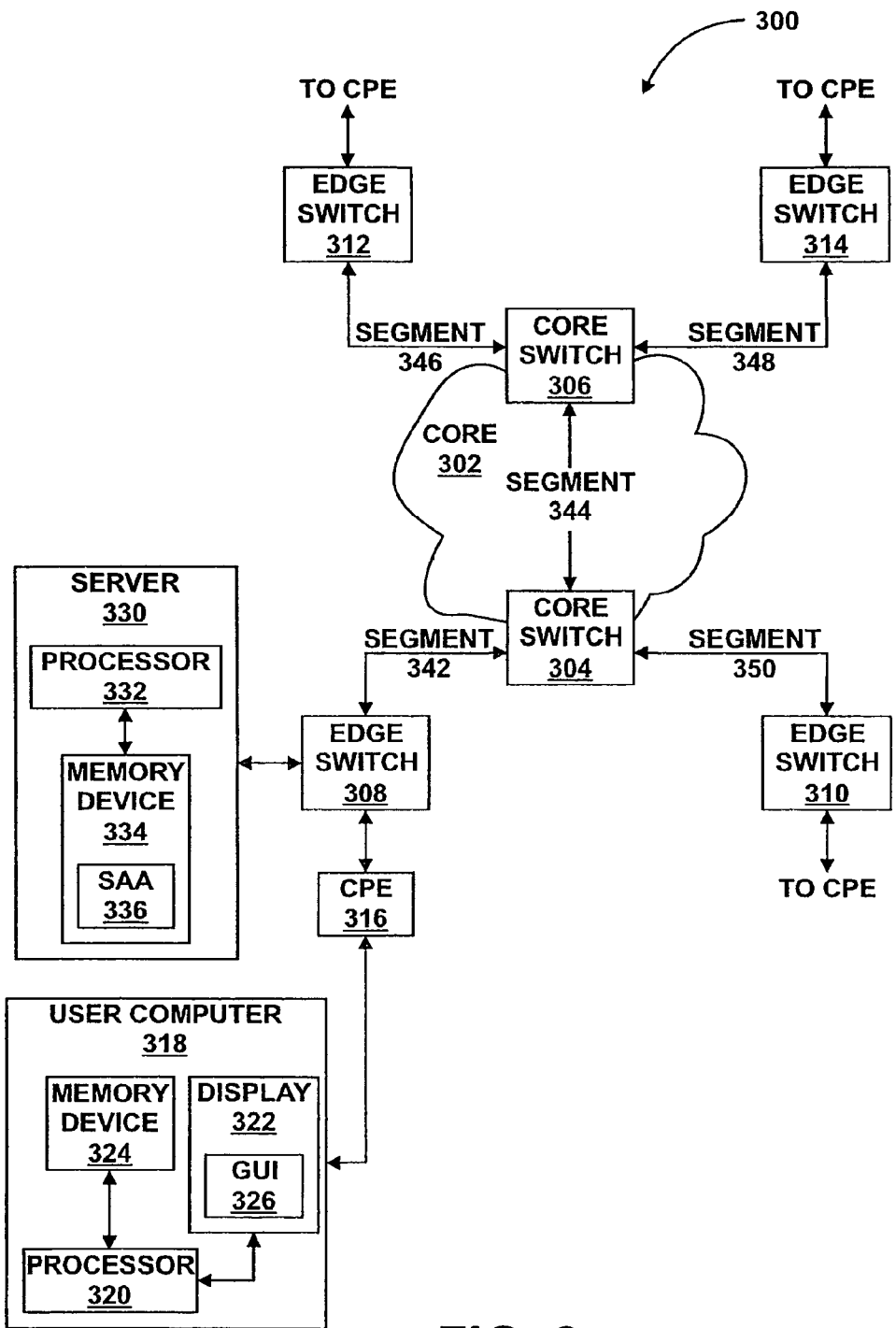

Referring to FIG. 3, another exemplary switched metro Ethernet network is shown and is generally designated 300. The network 300 can include a multipoint network having one or more Ethernet virtual connections (EVCs). As shown, the switched metro Ethernet network 300 includes a core system 302. The core system 302 includes a plurality of switches that are used to route network traffic through the core system 302. In particular, the core system 302 includes core switches 304 and 306. As illustrated in FIG. 3, the core switch 304 is coupled to edge switches 308 and 310 and the core switch 306 is coupled to edge switches 312 and 314. Each of the edge switches 308, 310, 312, and 314 can be coupled to a CPE, which may include a modem, a gateway, or a router. By way of illustration, a representative CPE 316 is shown as coupled to the edge switch 308.

A user computer 318 can be coupled to the CPE 316. The user computer 318 can include a desktop computer, a laptop computer, a handheld computer, and the like. In a particular embodiment, the user computer 318 includes a processor 320, a memory device 324 (e.g., random access memory (RAM)), and a display 322. As shown, a GUI 326 can be presented to a user at the user computer 318 via the display 322, where the GUI 326 can be used to present information regarding the operation of the switched metro Ethernet network 300.

As shown in FIG. 3, a server 330 can be coupled to an edge switch of the network 300, such as the edge switch 308. In a particular embodiment, the server 330 includes a processor 332 and a memory device 334. Further, an SAA 336 can be stored at the server 330 (e.g., in the memory device 334). In a particular embodiment, the SAA 336 includes a computer program or set of instructions that may be executed by the processor 332 in order to collect and determine one or more metrics concerning the operation of the switched metro Ethernet network 300. Further, the SAA 336 can present the metrics or data or results derived from the metrics to the user computer 318 via the GUI 326. Exemplary techniques for providing the data to a user via a GUI are described with reference to FIGS. 9 and 10.

As similarly discussed with reference to the network 100 of FIG. 1, service level agreement (SLA) metrics may be calculated or determined for one or more network connections within the switched metro Ethernet network 300. In a particular embodiment, these network metrics can include values for the overall jitter, delay, and/or packet delivery rate between first and second switches of a network connection. For example, the network metrics can include the overall jitter or delay for the network connection between the edge switch 308 and the edge switch 312, as well as the overall packet delivery rate for this network connection.

In certain instances, end-to-end metrics (e.g., from CPE to CPE) may not be available due to particular configurations of the edge switches and/or the CPEs. For example, the edge switches 308, 310, 312 and 314 may be configured to provide International Organization for Standardization (ISO) Network Layer 2 services whereby an IP address is not assigned to the customer facing port (i.e., the user network interface (UNI)) of the edge switch. To illustrate, the edge switches 308, 310, 312 and 314 can include, for example, a Cisco™ 3550 router. Accordingly, in such instances, metrics for edge-to-edge connections may be determined between edge switches (e.g., between the network to network interface or UNI) of the edge switches.

In a particular embodiment, the performance of an edge-to-edge network connection in the network 300 can be determined by obtaining SLA metrics for each time interval of a sequence of time intervals to determine statistically-significant SLA metrics concerning a sequence of network segments that represent the network connection. The SLA metrics can include values representing jitter, delay, and the overall packet delivery rate from edge to edge. The SLA metrics can include an overall packet delivery rate value, where the overall packet delivery rate value is determined based on the packet delivery rate values for one or more network segments of the network connection. In a particular embodiment, the packet delivery rate value determined for a particular network segment may be used in determining the overall packet delivery rate values for two or more network connections that utilize the same network segment. This reutilization of the packet delivery rate value for network segments that are shared by multiple network connections facilitates scaling of the network 300 and a reduction in the overall network traffic due to injected test packets because each network segment need only be tested once per time interval.

To illustrate, the network connection between the edge switch 308 and the edge switch 312 can be represented by the sequence of network segment 342, network segment 344, and network segment 346, whereas the network connection between the edge switch 308 and the edge switch 314 can be represented by the sequence of network segment 342, network segment 344, and network segment 348. Thus, because these two network connections share the network segment 342 and the network segment 344, the packet delivery rate values for the network segments 342 and 344 can be tested once but the test results are applicable to the determination of the overall packet delivery rate values for both network connections.

In a particular embodiment, the SLA metrics also can include a jitter value and/or and a delay value for a network connection. However, unlike packet delivery rate values, jitter and delay typically are not cumulative on a network segment-by-segment basis. Accordingly, in one embodiment, the total jitter and/or delay for a network connection are measured by determining a jitter value and/or a delay value for packets injected between one edge switch and another edge switch.

In a particular embodiment, the SAA 336 determines the SLA metrics based on test packets injected into the network 300 at the appropriate point. The resulting SLA metrics then may be compared with representative values to determine the performance of the monitored network connections. The representative values can include values associated with particular levels of service. For example, a network services provider may offer three levels of service (e.g., "bronze," "silver," and "gold") to customers, where each level of service has minimum performance metrics. A customer or network technician can utilize the SAA 336 to determine the SLA metrics for a network connection and then compare the SLA metrics to the minimum standard metrics for the service level associated with the network connection. In this manner, a customer or service provider may verify that the network connection is performing to acceptable standards. As disclosed with reference to FIGS. 9 and 10, SLA metric information can be presented to a user via a GUI at the user computer 318. Alternately, a GUI at the server 330 may be utilized to present the SLA metric information.

Figure 4:
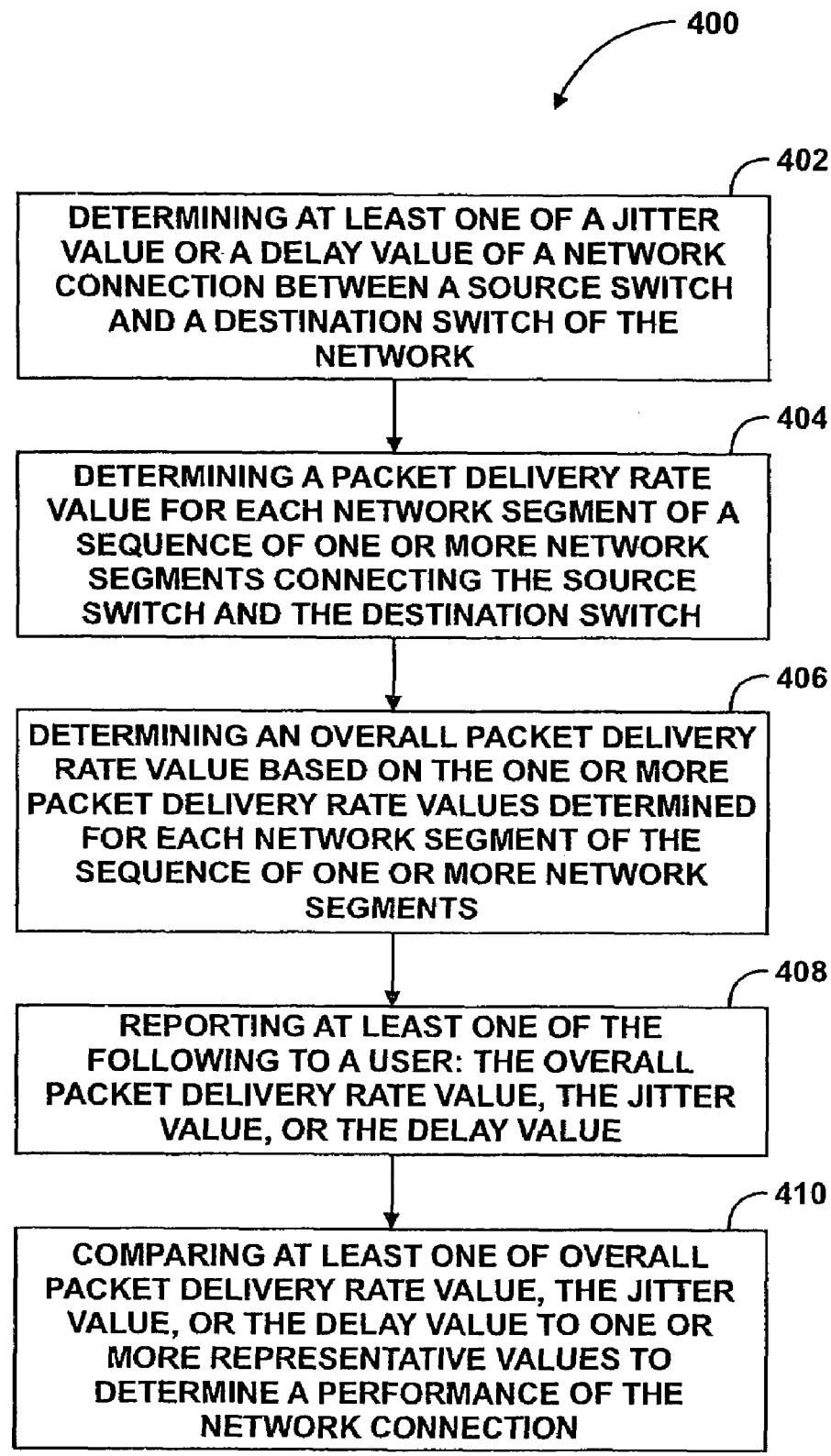

Referring to FIG. 4, a method for collecting one or more metrics related to a switched metro Ethernet system and for presenting the metrics to a user is illustrated. At block 402, the method includes determining at least one of a jitter value or a delay value of a network connection between a source switch and a destination switch of a network. In an illustrative embodiment, the jitter value or the delay value can be determined by injecting a plurality of data packets into the network for transmission from the source switch to the destination switch (e.g., from the edge switch 308 to the edge switch 312, FIG. 3), collecting a plurality of reflected data packets reflected from the destination switch to the source switch (e.g., from the edge switch 312 to the edge switch 308, FIG. 3), and calculating the jitter value and/or delay value based on transmission characteristics of the plurality of reflected data packets. In a particular embodiment, the injection and collection of data packets and the calculation of the jitter value and/or the delay value is performed by the SAA 336 (FIG. 3). Exemplary techniques for measuring latency and delay are discussed above with reference to Tables 2 and 3 and FIG. 2.

At block 404, the method includes determining a packet delivery rate value for each network segment of a sequence of network segments connecting the source switch and the destination switch (e.g., the sequence of network segments 342, 344 and 346 between switches 308 and 312, FIG. 3). In a particular embodiment, each network segment includes two switches, each of the two switches connected to one of a switch of another network segment, the source switch, or the destination switch. In a particular embodiment, the packet delivery rate value for a network segment is determined by injecting a plurality of data packets into the network for transmission from a first switch of the network segment to a second switch of the network segment (e.g., from core switch 304 to core switch 306 of network segment 344, FIG. 3). A plurality of reflected data packets from the second switch are collected, where the plurality of reflected data packets include at least a portion of the injected data packets. As similarly described above with respect to Table 1 and block 208 of FIG. 2, the packet delivery rate value for the network segment, in one embodiment, is determined based on a comparison of a total number of the reflected packets to a total number of the injected packets.

At block 406, the method includes determining an overall packet delivery rate value based on the one or more packet delivery rate values for each network segment of the sequence of network segments. In a particular embodiment, the overall packet delivery rate value for a sequence of network segments can be determined as a product of the packet delivery rate values for each network segment using the following equation:

$$\text{Overall } PDR = PDR_1 * PDR_2 * \ldots * PDR_{i-1} * PDR_i$$

where $PDR_i$ represents the PDR value determined for the ith network segment.

At block 408, the method includes reporting SLA metrics to a user, where the SLA metrics can include one or more of the overall packet delivery rate value, the jitter value or the delay value to a user. The SLA metrics can be reported by presenting related information via, e.g., the GUI 326 at the user computer 318 (FIG. 3). At block 410, the method includes comparing at least one of the overall packet delivery rate value, the jitter value, or the delay value to one or more representative values to determine a performance of the network connection. This comparison may be performed automatically (e.g., by the SAA 336, FIG. 3) or may be presented to a user for manual comparison. As noted above, in a particular embodiment, the representative values are indicative of a minimum expected service for a given service level associated with the network connection. By comparing the measured SLA metrics with the minimum expected metrics for a particular service, a customer or network technician can verify whether the network connection is performing as expected.

In a particular embodiment, the method of FIG. 4 may be periodically repeated to reevaluate the performance of the network connection. To illustrate, in one exemplary, non-limiting embodiment, an updated jitter value, an updated delay value and an updated overall packet delivery rate value are determined at five minute intervals by injecting five data packets from edge-to-edge for determination of a jitter value and/or delay value, and by injecting between sixty to three hundred data packets into each network segment, depending on service level. After the jitter, delay, and/or overall packet delivery rate have been measured for a sequence of time intervals, the metrics for each interval can be correlated to the metrics of the other intervals to generate statistically-significant SLA metrics for use in evaluating the performance of a network connection.

As noted above, certain network segments may be common to two or more network connections. Accordingly, the packet delivery rate value for a network segment determined while calculating the overall packet delivery rate value for one network connection may be reused when calculating the overall packet delivery rate value for one or more other network connections using the same network segment, thereby reducing the total number of packets injected into the network for metric measurement purposes.

Figure 5:
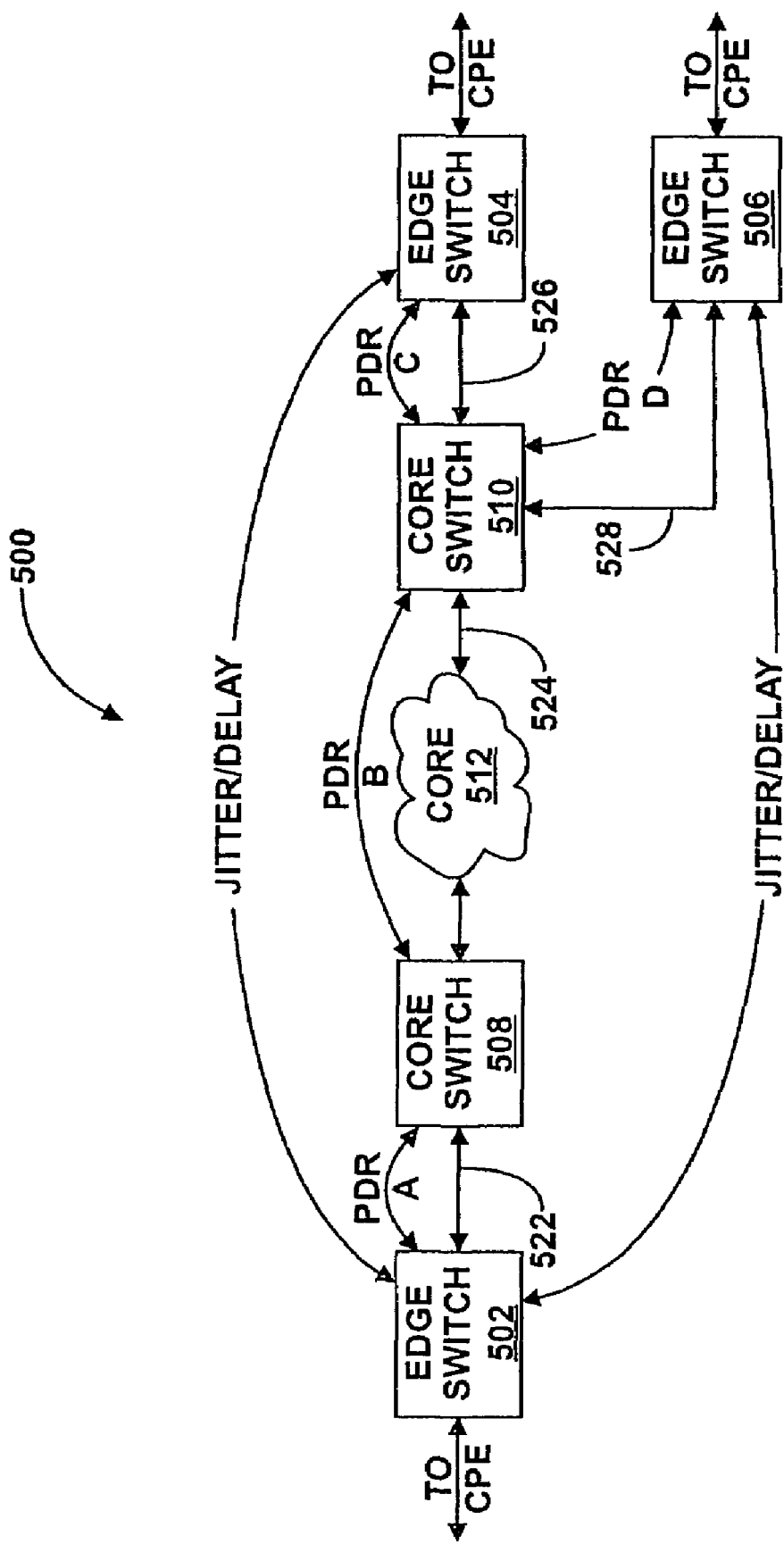
Figure 6:
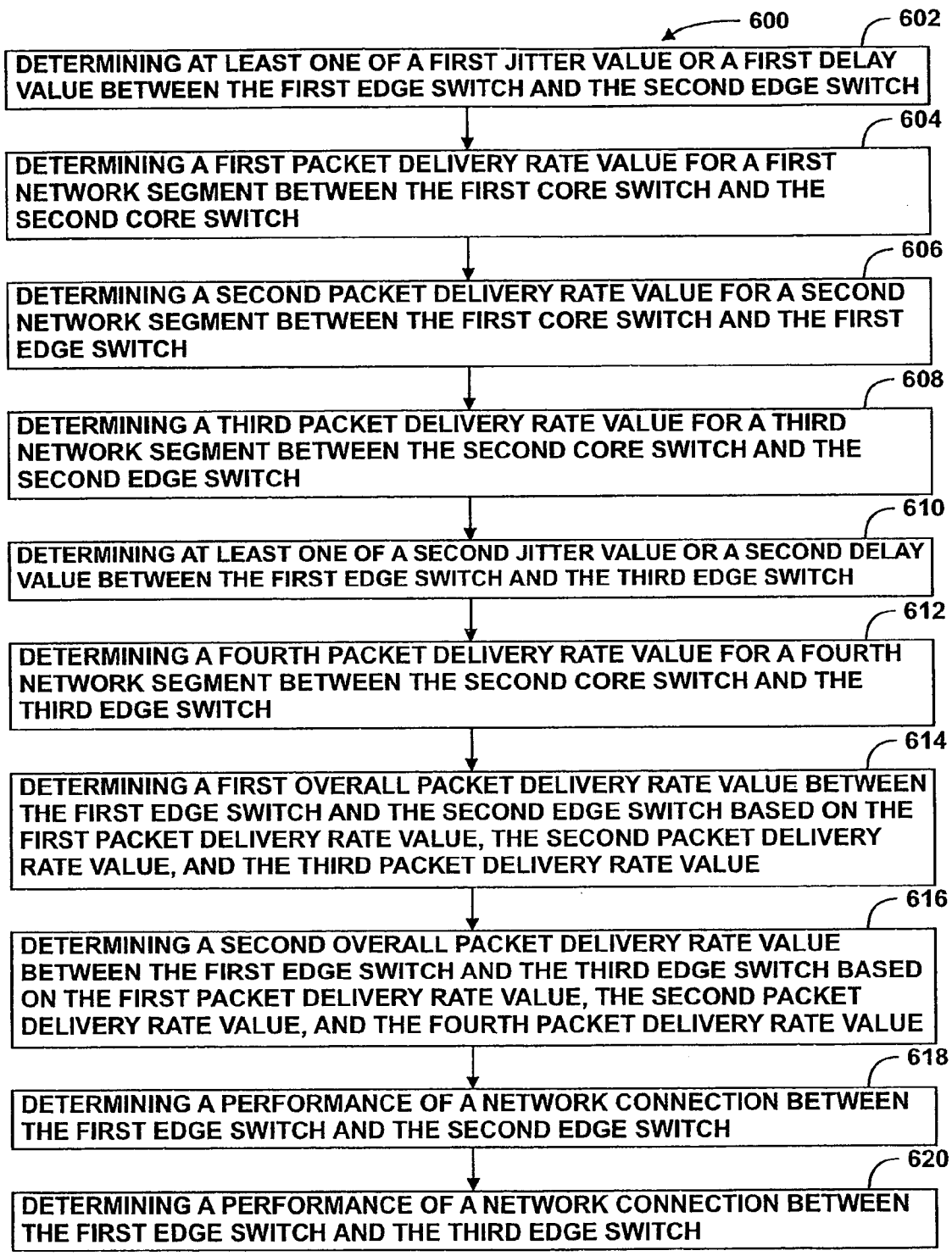

Referring to FIGS. 5 and 6, an exemplary, non-limiting technique for determining statistically significant SLA metrics in a switched metro Ethernet connection having network connections with shared segments is illustrated. As shown in FIG. 5, an exemplary switched metro Ethernet network 500 includes edge switches 502, 504 and 506 and core switches 508 and 510 (as part of core network 512). As shown by FIG. 5, the network connection between the edge switch 502 and the edge switch 504 and the network connection between the edge switch 502 and the edge switch 506 share the network segment 522 between the edge switch 502 and the core switch 508 and the network segment 524 between the core switch 508 and the core switch 510. As illustrated by the method 600 of FIG. 6, the SLA metrics measured for these shared segments may be used to determine the SLA metrics for both network connections.

As shown by FIG. 6, at block 602 the method includes determining at least one of a first jitter value or a first delay value between a first edge switch (e.g., edge switch 502) and a second edge switch (e.g., edge switch 504). At block 604, the method includes determining a first packet delivery rate value (e.g., PDR A) for a first network segment between the first core switch and the second core switch (e.g., the network segment 522). At block 606, the method includes determining a second packet delivery rate value (e.g., PDR B) for a second network segment (e.g., the network segment 524, FIG. 5) between the first core switch and the first edge switch. At block 608, the method includes determining a third packet delivery rate value (e.g., PDR C) for a third network segment (e.g., the network segment 526, FIG. 5) between the second core switch and the second edge switch. At block 610, the method includes determining at least one of a second jitter value or a second delay value between the first edge switch and the third edge switch (e.g., between the edge switch 502 and the edge switch 506). At block 612, the method includes determining a fourth packet delivery rate value (e.g., PDR D) for a fourth network segment between the second core switch and the third edge switch (e.g., the network segment 528).

As discussed, the first and second jitter values and/or the first and second delay values may be determined by injecting data packets into the network 500 between the first edge switch (e.g., edge switch 502) and the second edge switch (e.g., edge switch 504) and between the first edge switch and the third edge switch (e.g., edge switch 506), and then calculating the jitter and/or delay values based on the transmission characteristics of reflected data packets.

At block 614, the method includes determining a first overall packet delivery rate value between the first edge switch and the second edge switch based on the first packet delivery rate value, the second packet delivery rate value, and the third packet delivery rate value. At block 616, the method includes determining a second overall packet delivery rate value between the first edge switch and the second edge switch based on the first packet delivery rate value, the second packet delivery rate value, and the fourth packet delivery rate value. As discussed above, the first overall packet delivery rate value may be determined based on a product of the first, second and third packet delivery rate values and the second overall packet delivery rate value may be determined based on a product of the first, second and fourth packet delivery rate values.

At block 618, the method includes determining a performance of the network connection between the first edge switch and the second edge switch. At block 620, the method includes determining a performance of the network connection between the first edge switch and the third edge switch. As noted above, the performance of a network connection may be automatically or manually evaluated by comparing the network connection's SLA metrics with representative standard values for the service level associated with the network connection. To illustrate, if a network connection is associated with a "gold" level service that sets a standard of a packet delivery rate of no less than 99.5% and if the overall packet delivery rate value for the network connection is 99.6%, the performance of the network connection can be assessed as satisfactory with regard to the packet delivery rate criteria for the service level.

In a particular embodiment, a service assurance agent (SAA) implemented at a server connected to one of the edge switches 502, 504 or 506 manages the injection of data packets, the collection of reflected data packets and the evaluation of transmission characteristics of these reflected packets for SLA metric purposes. Moreover, the SAA can perform a comparison of the measured SLA metrics for network performance purposes. The SAA also can be utilized to provide SLA metric information and performance information to a user computer (e.g., user computer 318, FIG. 3) for provision to a user.

Figure 7:
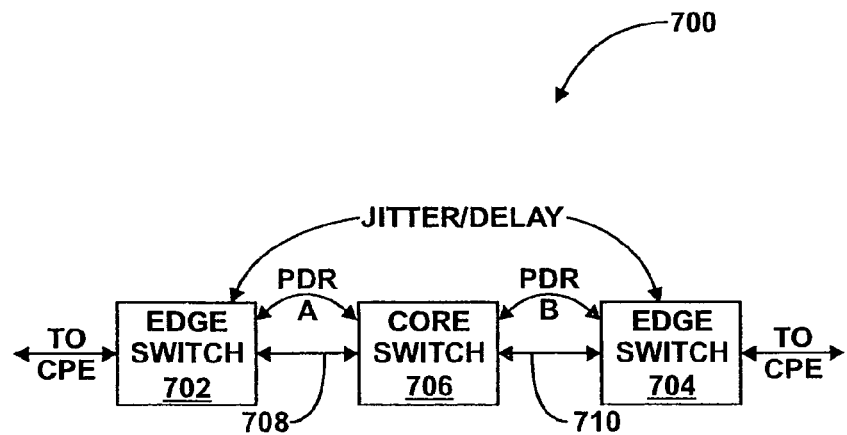
Figure 8:
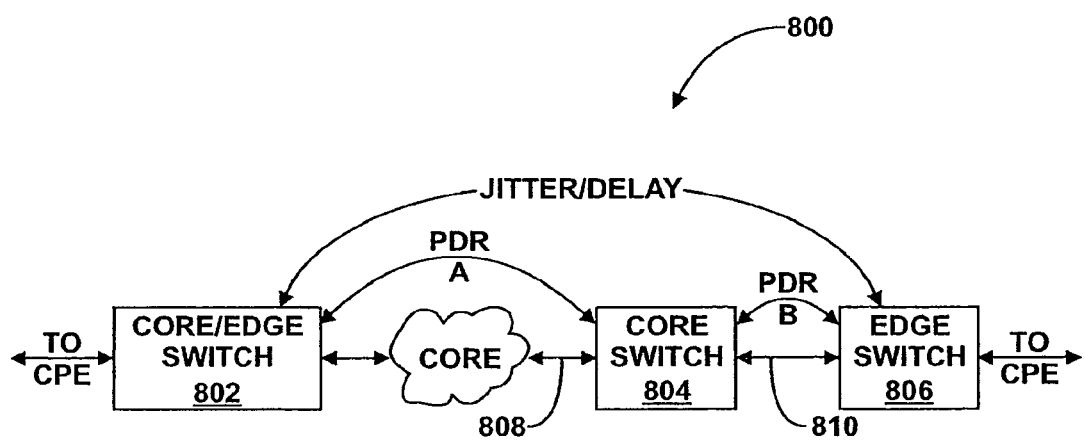

Referring to FIGS. 7 and 8, exemplary, non-limiting embodiments of various switched metro Ethernet network topologies are illustrated. FIG. 7 illustrates a switched metro Ethernet network 700 including edge switches 702 and 704 connected via a single core switch 706. In the network topology shown in FIG. 7, the SLA metrics for the network connection between the edge switch 702 and the edge switch 704 may be measured by determining the jitter value and/or the delay value between the edge switches 702 and 704 and by determining the overall packet delivery rate values between the edge switches 702 and 704 based on the individual packet delivery rate values PDR A and PDR B of the network segments 708 and 710, respectively.

FIG. 8 illustrates a switched metro Ethernet network 800 including a combined core edge switch 802, a core switch 804, and an edge switch 806. As with the network 700 of FIG. 7, the SLA metrics for the network connection between the core/edge switch 802 and the edge switch 806 may be measured by determining the jitter value and/or the delay value between the core/edge switch 802 and the edge switch 806 and by determining the overall packet delivery rate values between the core/edge switch 802 and the edge switch 806 based on the individual packet delivery rate values PDR A and PDR B of the network segments 808 and 810, respectively.

Although FIGS. 5, 7 and 8 illustrate various exemplary switched metro Ethernet network topologies that can advantageously utilize scaled SLA metric measurements for determining network performance, other topologies also may be utilized based on the teachings herein.

Figure 9:
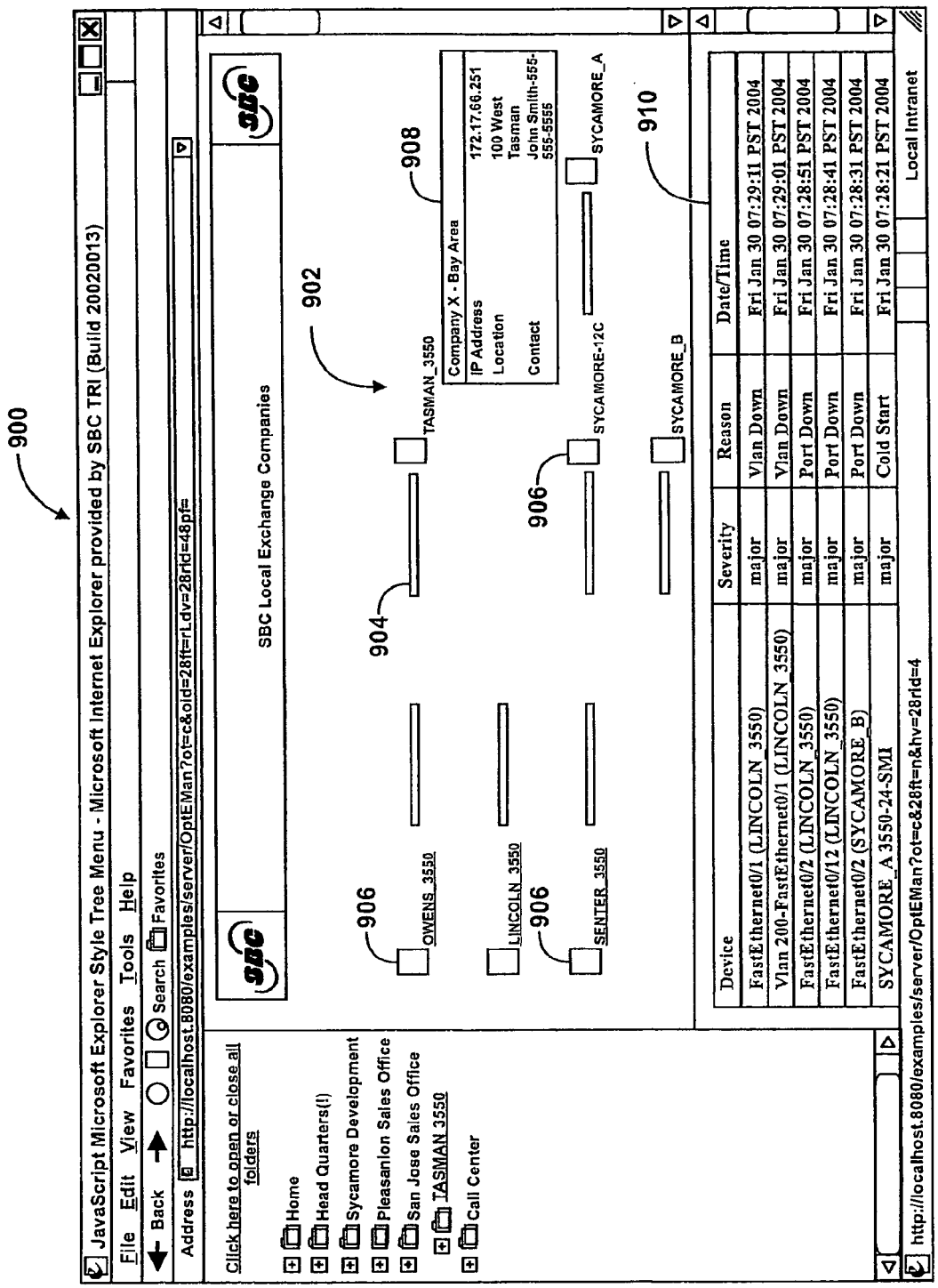
FIG. 9 is a general diagram representative of an embodiment of a graphical user interface that can be used to present one or more metrics related to a switched metro Ethernet system.

Referring to FIG. 9, an exemplary, non-limiting embodiment of a graphical user interface (GUI) is shown and is generally designated 900. As shown, the GUI 900 includes a graphical representation of a user's network 902 showing a core network 904 and different CPE 906 and their locations. Further, the GUI 900 includes an information window 908 that provides information relevant to specific CPE 906 when selected by a user. FIG. 9 also shows that the GUI 900 includes an information table 910 that provides network trouble information, e.g., device type, problem severity, reason, and date/time.

Figure 10:
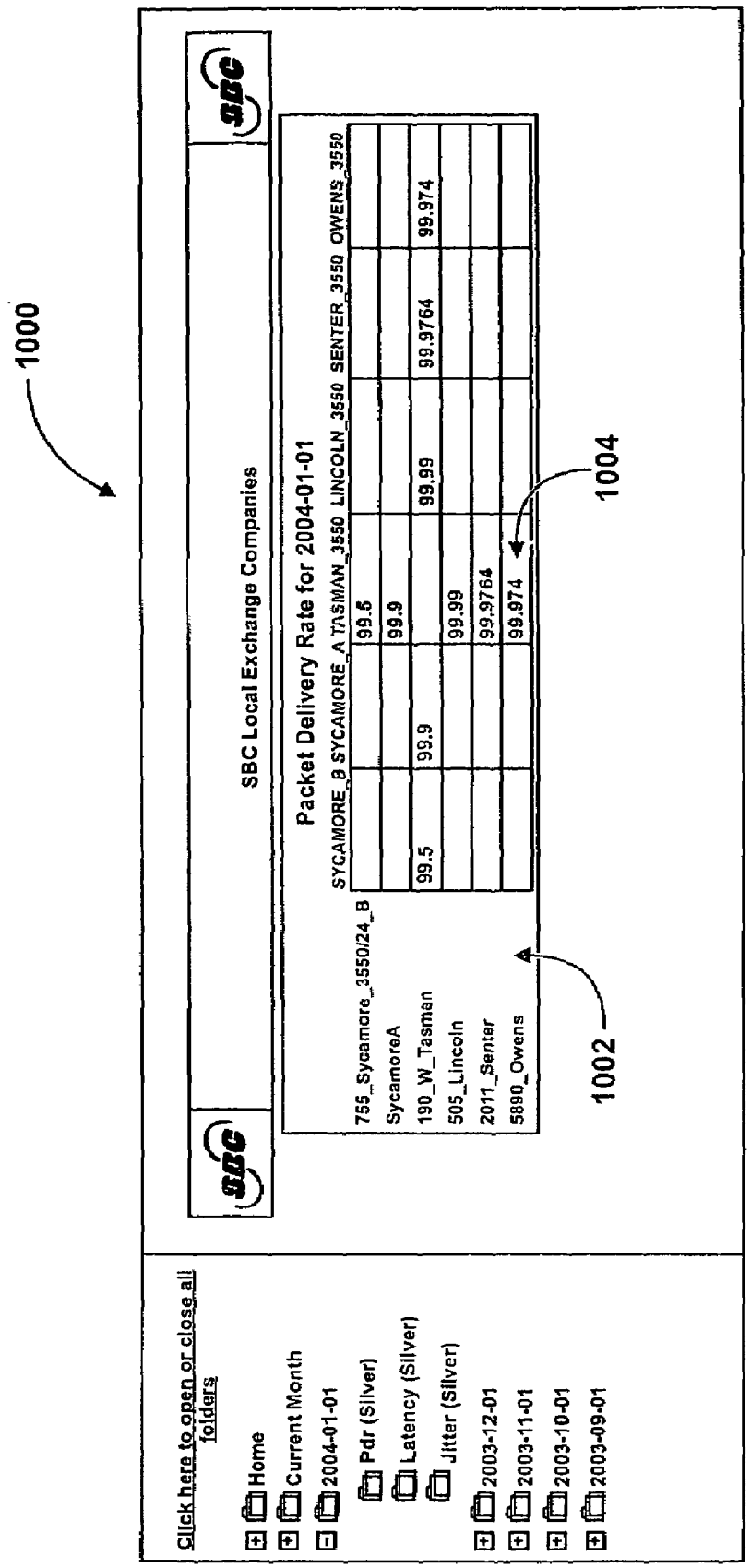
FIG. 10 is a general diagram representative of another embodiment of a graphical user interface that can be used to present one or more metrics related to a switched metro Ethernet system.

FIG. 10 shows another exemplary, non-limiting embodiment of a GUI, designated 1000. The GUI 1000 shown in FIG. 10 includes a matrix 1002 of information blocks 1004. A user can use the GUI 1000 to determine a jitter value, a latency value, and a packet delivery rate between two CPEs or between two edge switches within a switched metro Ethernet network. Further, the GUI 1000 can indicate a level of service provided for in a service level agreement. In a particular embodiment, the GUI 1000 can indicate the level of service by providing a certain color within the information blocks 1004, e.g., bronze, silver, or gold.

In a particular embodiment, GUI 900 and/or GUI 1000 are implemented as web pages displayed by a web browser. The one or more data files representing the web pages may be generated and/or stored at a server (e.g., server 330, FIG. 3) and accessible via the switched metro Ethernet network being monitored.

With the configuration of structure described above, the system and method for collecting and presenting service level agreement metrics disclosed herein provides the capability for determining jitter, latency, and packet delivery rate values between two edge switches within a switched metro Ethernet network. Each edge switch is coupled to a CPE and each edge switch represents the outer boundary of the portion of a switched metro Ethernet network that is under the control of a service provider. As such, the system and method can provide a close approximation of the jitter, latency, and packet delivery rate values between two CPEs coupled to the edge switches or between two edge switches. Further, a GUI is provided for presenting jitter, latency, and packet delivery rate information to a user via a computer. Using the information presented via the GUI, a user can verify that the terms of a service level agreement are being met.

Figure 11:
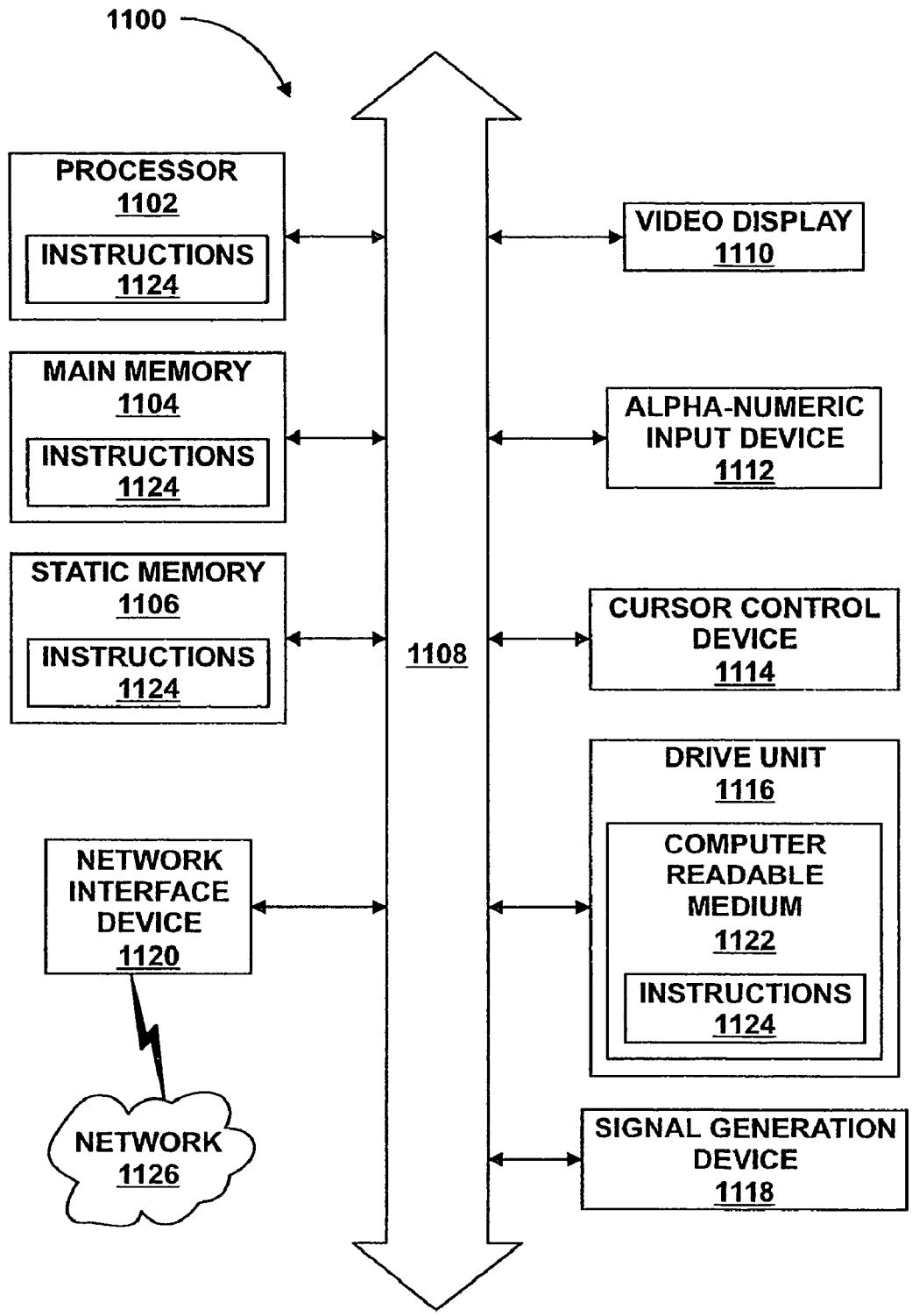
FIG. 11 is a general diagram representative of an embodiment of a general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video, or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for monitoring a network, the method comprising:
   periodically determining, at a computer system, at least one of a jitter value and a delay value of a network connection between a source switch and a destination switch of the network based on transmission characteristics of reflected artificial data packets from periodically injected artificial data packets;
   determining a packet delivery rate value for each network segment of a sequence of one or more network segments connecting the source switch and the destination switch, each network segment comprising two switches, wherein at least one of the two switches is connected to one of a switch of another network segment, the source switch, and the destination switch based on the transmission characteristics of the reflected artificial data packets;
   determining an overall packet delivery rate value based on the packet delivery rate values determined for each network segment of the sequence of one or more network segments;
   comparing at least one of the overall packet delivery rate value, the jitter value, and the delay value to one or more representative values to determine a performance of the network connection, wherein each of the one or more representative values is indicative of a minimum performance level associated with a particular service tier of a plurality, of service tiers; and
   based on the comparison, determining whether the network connection satisfies the minimum performance level associated with the particular service tier,
   wherein determining the overall packet delivery rate value comprises multiplying each of the packet delivery rate value for each network segment of the sequence of the one or more network segments.

2. The method of claim 1, further comprising:
reporting at least one of the following to a user: the overall packet delivery rate value; the jitter value; or the delay value.

3. The method of claim 2, further comprising:
comparing at least one of the overall packet delivery rate value, the jitter value, or the delay value to one or more representative values to determine a performance of the network connection.

4. The method of claim 1, wherein the overall packet delivery rate value and at least one of the jitter value or the delay value are calculated for each time interval of a sequence of time intervals, and wherein the method further comprises correlating the overall packet delivery rate value for at least a subset of the sequence of time intervals and correlating at least one of the jitter value or the delay value for at least a subset of the sequence of time intervals to determine statistically significant service level agreement metrics.

5. The method of claim 1, further comprising:
periodically injecting the artificial data packets into the network for transmission from the source switch to the destination switch;
collecting the reflected artificial data packets, wherein the reflected artificial data packets are reflected from the destination switch to the source switch in response to the periodically injected artificial data packets being injected into the network.

6. The method of claim 5, wherein the plurality of artificial data packets are created at a server and injected at the source switch.

7. The method of claim 6, wherein the plurality of artificial data packets are created by a service assurance agent at the server.

8. The method of claim 5, wherein the determining the packet delivery rate value for each network segment of the sequence of the one or more network segments comprises:
determining the packet delivery rate value for the network segment based on a comparison of a total number of the reflected artificial data packets to a total number of the plurality of artificial data packets injected into the network.

9. The method of claim 1, wherein the network is a switched metro Ethernet network.

10. The method of claim 9, wherein the switched metro Ethernet network is a multipoint network.

11. The method of claim 10, wherein the network connection is an Ethernet virtual connection.

12. A server comprising: a processor; a memory device coupled to the processor; a service assurance agent represented by a plurality of executable instructions stored at the memory device, the plurality of executable instructions comprising instructions to manipulate the processor to: periodically determine at least one of a jitter value and a delay value between a source switch and a destination switch of a network connection based on transmission characteristics of reflected artificial data packets from periodically injected artificial data packets;
determine a packet delivery rate value for each network segment of a sequence of one or more network segments connecting the source switch and the destination switch, each network segment comprising two switches, wherein at least one of the two switches is connected to one of a switch of another network segment, the source switch, and the destination switch based on the transmission characteristics of the reflected artificial data packets;
determine an overall packet delivery rate value based on the packet delivery rate values determined for each network segment of the sequence of one or more network segments;
compare at least one of the overall packet delivery rate value, the jitter value, and the delay value to one or more representative values to determine a performance of the network connection,
wherein each of the one or more representative Values is indicative of a minimum performance level associated with a particular service tier of a plurality of service tiers; and based on the comparison, determine whether the network connection satisfies the minimum performance level associated with the particular service tier,
wherein determining the overall packet delivery rate value comprises multiplying each of the packet delivery rate value for each network segment of the sequence of the one or more network segments.

13. The server of claim 12, wherein the service assurance agent further includes executable instructions to manipulate the processor to:
report at least one of the following to a user: the overall packet delivery rate value; the jitter value; or the delay value.

14. The server of claim 12, wherein the service assurance agent further includes executable instructions to manipulate the processor to:
compare at least one of the overall packet delivery rate value, the jitter value, or the delay value to one or more representative values to determine a performance of the network connection.

15. In a switched metro Ethernet network having a first core switch, a second core switch, a first edge switch and a second edge switch, where the first core switch is coupled to the first edge switch and wherein the second core switch is coupled to the second edge switch, a method comprising:
determining, at a computer system, at least one of a first jitter value and a first delay value between the first edge switch and the second edge switch based on transmission characteristics of reflected artificial data packets from a plurality of injected artificial data packets;
determining a first packet delivery rate value for a first network segment between the first core switch and the second core switch;
determining a second packet delivery rate value for a second network segment between the first core switch and the first edge switch;
determining a third packet delivery rate value for a third network segment between the second core switch and the second edge switch;
determining a first overall packet delivery rate value between the first edge switch and the second edge switch based on the first packet delivery rate value, the second packet delivery rate value, and the third packet delivery rate value;
comparing at least one of the first overall packet delivery rate value, the first jitter value, and the first delay value to one or more representative values to determine a performance of the first network segment, wherein each of the one or more representative values is indicative of a minimum performance level associated with a particular service tier of a plurality of service tiers; and based on the comparison, determining whether the first network segment satisfies the minimum performance level associated with the particular service tier, wherein determining the overall packet delivery rate value comprises multiplying each of the packet delivery rate value for each network segment of the sequence of the one or more network segments.

16. The method of claim 15, wherein the switched metro Ethernet network further includes a third edge switch connected to the second core switch and wherein the method further comprises:

determining at least one of a second jitter value or a second delay value between the first edge switch and the third edge switch;

determining a fourth packet delivery rate value for a fourth network segment between the second core switch and the third edge switch; and determining a second overall packet delivery rate value between the second edge switch and the third edge switch based on the first packet delivery rate value, the second packet delivery rate value, and the fourth packet delivery rate value.

17. The method of claim 16, further comprising:

reporting at least one of the following to a user: the first overall packet delivery rate value, or the second overall packet delivery rate.

18. A switched metro Ethernet network comprising: a core network system comprising a first core switch and a second core switch; a first edge switch coupled to the first core switch; a second edge switch coupled to the second core switch; a server coupled to the core network system, the server to:

determine at least one of a first jitter value and a first delay value between the first edge switch and the second edge switch based on transmission characteristics of reflected artificial data packets from a plurality of injected artificial data packets;

determine a first packet delivery rate value for a first network segment between the first core switch and the second core switch;

determine a second packet delivery rate value for a second network segment between the first core switch and the first edge switch;

determine a third packet delivery rate value for a third network segment between the second core switch and the second edge switch;

determine a first overall packet delivery rate value between the first edge switch and the second edge switch based on the first packet delivery rate value, the second packet delivery rate value, and the third packet delivery rate value;

comparing at least one of the first overall packet delivery rate value, the first jitter value, and the first delay value to one or more representative values to determine a performance of the first network segment, wherein each of the one or more representative values is indicative of a minimum performance level associated with a particular service tier of a plurality of service tiers; and based on the comparison, determining whether the first network segment satisfies the minimum performance level associated with the particular service tier, wherein determining the overall packet delivery rate value comprises multiplying each of the packet delivery rate value for each network segment of the sequence of the one or more network segments.

19. The switched metro Ethernet network of claim 18, further comprising:

a third edge switch coupled to the first core switch; and wherein the server further is to:

determine at least one of a second jitter value or a second delay value between the first edge switch and the third edge switch;

determine a fourth packet delivery rate value for a fourth network segment between the second core switch and the third edge switch; and determine a second overall packet delivery rate value between the first edge switch and the third edge switch based on the first packet delivery rate value, the second packet delivery rate value, and the fourth packet delivery rate value.

* * * * *